United States Patent
Oroskar

(10) Patent No.: US 8,954,097 B1
(45) Date of Patent: Feb. 10, 2015

(54) METHODS AND SYSTEMS FOR IMPLEMENTING DYNAMIC MODULATION SCHEMES BASED ON PAGING AREA

(75) Inventor: Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 263 days.

(21) Appl. No.: 13/556,386

(22) Filed: Jul. 24, 2012

(51) Int. Cl.
*H04W 68/00* (2009.01)

(52) U.S. Cl.
USPC ........... 455/458; 370/330; 370/331; 455/509; 455/515

(58) Field of Classification Search
None
See application file for complete search history.

(56) References Cited

U.S. PATENT DOCUMENTS

| | | | |
|---|---|---|---|
| 2008/0037661 A1* | 2/2008 | Xun | 375/259 |
| 2010/0075698 A1* | 3/2010 | Rune et al. | 455/458 |
| 2010/0216472 A1* | 8/2010 | Youn et al. | 455/436 |
| 2010/0220680 A1* | 9/2010 | Ramankutty et al. | 370/329 |

* cited by examiner

*Primary Examiner* — Awet Haile

(57) ABSTRACT

Disclosed herein are methods and systems for implementing dynamic modulation schemes based on paging area. In one embodiment, a radio access network (RAN) receives a request to page a user equipment (UE), and identifies the cell in which the UE was last registered. The RAN sends one or more paging requests in one or more cells, where the respective modulation coding scheme (MCS) that the RAN selects for each such paging request depends at least in part on the distance of the receiving cell from the cell in which the UE was last registered.

14 Claims, 5 Drawing Sheets

METHODS AND SYSTEMS FOR IMPLEMENTING DYNAMIC MODULATION SCHEMES BASED ON PAGING AREA

BACKGROUND

In a typical cellular radio communication system (wireless communication system), an area is divided geographically into a number of cell sites, each defined by a radio-frequency (RF) radiation pattern from a respective antenna or antenna system. The antennas in the cells are in turn coupled to some form of controller, which is then coupled to a telecommunications switch or gateway, such as a mobile switching center (MSC) and/or a packet data serving node (PDSN), as examples. These (and possibly other) elements function collectively to form a radio access network (RAN) of the wireless communication system. The switch or gateway may then be coupled with one or more transport networks, such as one or more circuit-switched networks (e.g., the public switched telephone network (PSTN)) and/or one or more packet-switched networks (e.g., the Internet).

Depending on the specific underlying technologies and architecture of a given wireless communication system, the RAN elements may take different forms. As one example, in a code division multiple access (CDMA) system configured to operate according to the IS-2000 and IS-856 standards, the antenna system is typically referred to as a base transceiver system (BTS) and is usually under the control of an entity typically referred to as a base station controller (BSC). As another example, in a universal mobile telecommunications system (UMTS) configured to operate according to the Long Term Evolution (LTE) standards, the antenna system is usually referred to as an eNodeB, and the entity that typically coordinates functionality between multiple eNodeBs is usually referred to as a mobility management entity (MME). Furthermore, other architectures and operational configurations of RANs are known to those of skill in the art, and others may hereafter be developed.

In connection with a given service provider's wireless communication system, subscribers (i.e., users) typically access the system for communication services using a communication device, such as a cellular telephone, smartphone, pager, or appropriately equipped portable computer, to name just a few examples. In a CDMA system, such a communication device is often referred to as an access terminal (AT) while, in an LTE system, that communication device is often referred to as a user equipment (UE). For simplicity, the balance of this description often refers to such communication devices as "UEs," though it should be understood that, as used herein, this term encompasses ATs, cell phones, smart phones, air cards, and/or any other client-side wireless-communication devices that may access and communicate via one or more RANs. Similarly, "base station" is often used in the balance of this description as a term that encompasses BTSs, eNodeBs, and the like, and may also encompass their respective controller (e.g., a BSC, MME, etc.).

When a UE is positioned in a cell, it communicates via an RF air interface with the base station of the cell. Consequently, a communication path or "channel" is established between the UE and the transport network, via the air interface, the base station, and the switch or gateway. Moreover, it is noted that the actual physical configuration of a base station can vary from an integrated BTS-BSC or eNodeB unit to a distributed deployment of multiple BTSs under the control of a single BSC, or multiple eNodeBs under the control of a single MME. Regardless of whether a base station is configured to support one cell, multiple cells, multiple sectors, or some other arrangement, it is typically deployed to provide coverage over a geographical area on the scale of a few square miles and for tens to hundreds to several thousands (or more) of UEs at any one time.

OVERVIEW

In a RAN, communication signals transmitted from a base station to a UE on a downlink channel are often modulated with other communication signals transmitted to other UEs in the cell serviced by the base station. The modulation scheme employed may depend on the type of wireless-communication technology employed by the RAN. For instance, in an LTE network, a base station may use one of three modulation coding schemes (MCSs) for downlink-channel transmissions: quadrature phase-shift keying (QPSK), 16-quadrature amplitude modulation (QAM), and 64-QAM. Each of these modulation schemes has particular advantages and disadvantages as compared to one another. For instance, a signal modulated using QPSK can typically be transmitted at a lower power and be less susceptible to interference than could a signal modulated using 16-QAM, but the QPSK-modulated signal would also typically contain less data than the 16-QAM-modulated signal.

According to a typical configuration, when a RAN attempts to initiate a communication session with a UE, the RAN may send a paging request to the UE via one or more base stations. The paging request may include information indicative of an address or similar identifier of the UE and of one or more parameters necessary for the UE to establish a communication session with the RAN. The RAN may send a first paging request via a base station that provides service to the cell in which the UE last registered. If the UE does not answer that first paging request, the RAN may then send a second paging request via additional base stations in the vicinity of the cell in which the UE was last registered. These two (i.e., first and second) paging requests are typically sent using the same MCS.

In an LTE network, the downlink channels are time and frequency-aligned. Thus, a paging request consumes at least some of the shared data resources of the cell(s) in which the paging request is sent. In a situation where multiple paging requests are sent in multiple cells, the data capacity available to conduct communications on downlink channels with other UEs in those cells may be reduced, especially if the paging requests are sent using an MCS that has a relatively low bits-per-symbol ratio, in which case the paging request would tend to include a lesser amount of data as compared with a paging request sent using an MCS having a higher bits-per-symbol ratio). This may result in reduced data connectivity and performance for other UEs attempting to communicate with the RAN. However, because paging requests (and other messages) that are sent using an MCS having a relatively higher bits-per-symbol ratio are more susceptible to interference and/or propagation loss, the UE to which such paging requests are directed may not receive paging requests sent using such an MCS.

Presently disclosed are methods and systems for implementing dynamic modulation schemes based on paging area. Employment of the present methods and systems may reduce the amount of data resources consumed by paging requests. In an embodiment, a RAN sends a first paging request using a first MCS in a UE in a cell in which the UE last registered. Since the UE is statistically more likely to be in the cell in which it was last registered (as compared to any other particular cell), the first MCS may be an MCS that has a low bits-per-symbol ratio, such as QPSK, thereby improving the probability that the UE will receive the first paging request. If the UE does not respond to the first paging request, the RAN sends one or more additional paging requests in other cells. Since the UE is statistically less likely to be in a given cell the greater the distance between that cell and the cell in which the UE was last registered, the respective MCSs used by the RAN for the additional paging requests may have higher bits-per-symbol ratios than does the first MCS. This approach may reduce the data resources consumed by paging requests sent in cells in which the UE is less likely to be.

Another embodiment may take the form of a method that includes a RAN receiving a request to page a UE. This embodiment further includes the RAN identifying a cell in the RAN in which the UE last registered. This embodiment further includes the RAN sending one or more paging requests in one or more cells in the RAN, where the RAN selects a respective MCS for each such paging request based at least in part on a distance of a receiving cell from the cell in which the user equipment was last registered.

Yet another embodiment may take the form of a method that includes a RAN receiving a request to page a UE. This embodiment also includes the RAN identifying a cell in the RAN in which the UE was last registered, and further includes the RAN sending a first paging request using a first MCS in a first group of one or more cells in the RAN. The first group of one or more cells may be within a first distance of the cell in which the UE was last registered. This embodiment further includes the RAN determining whether the UE received the first paging request and, if not, responsively resending the first paging request in the first group of cells, and also sending a second paging request using a second MCS in a second group of one or more cells that are within a second distance from the cell in which the UE was last registered. In this embodiment, the second distance is greater than the first distance, and the second group of cells excludes the first group of cells.

Still another embodiment may take the form of a RAN that includes (a) a plurality of base stations, (b) a UE, and (c) an MME that is configured to receive a request to page the UE. In this embodiment, the MME is also configured to identify the cell in which the UE was last registered, and to send one or more paging requests via one or more of the base stations. The MCS used for each paging request may depend on the distance between the receiving cell and the cell in which the UE was last registered.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

The present methods and systems are described in further detail below with reference to the drawings, in which.

DETAILED DESCRIPTION OF THE DRAWINGS

1. Example Network Architecture

Figure 1:
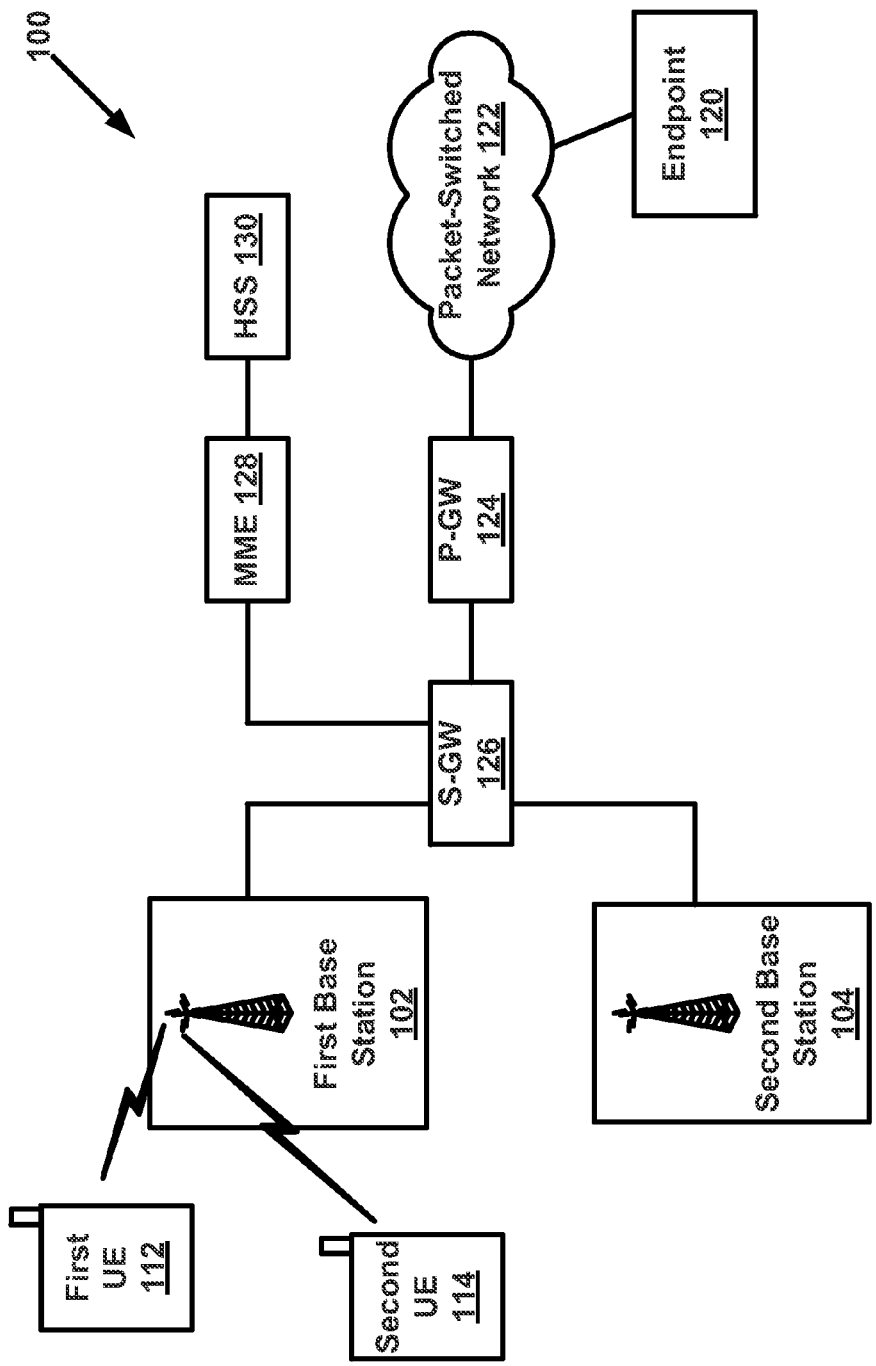
FIG. 1 is a simplified block diagram of an example of a communication system in which at least one embodiment could be carried out.

FIG. 1 is a simplified block diagram of a wireless telecommunications network 100. For purposes of illustration, FIG. 1 shows a network architecture that may be used in an LTE system, though other network architectures could be used.

The network 100 includes a plurality of wireless access points, which are represented in FIG. 1 by a first base station 102 and a second base station 104. In LTE terminology, the base stations 102 and 104 may each correspond to an eNodeB. The base stations 102 and 104 may each provide a wireless coverage area (e.g., cell, sector, cell-sector, and the like) within which the base station provides wireless service to UEs. The respective wireless coverage areas provided by the base stations 102 and 104 could be either overlapping or non-overlapping; they could be co-extensive, or one could be encompassed within another; and certainly other possibilities abound. Although FIG. 1 shows network 100 having two base stations, it is to be understood that network 100 could include a greater or lesser number.

For illustration, the first base station 102 is shown as communicating with a first UE 112 and a second UE 114. In an embodiment, the wireless communications between the base station 102 and UEs 112 and 114 involve orthogonal frequency-division multiplexing (OFDM) of signals on one or more downlink channels (communications transmitted from the first base station 102 to the UEs 112 and 114) and on one or more uplink channels (communications from the UEs 112 and 114 to the base station 102). Although FIG. 1 shows the first base station 102 serving two UEs, it is understood that each of the base stations 102 and 104 may serve a greater or lesser number of UEs at various points in time.

The UEs 112 and 114 could engage in communication sessions with an endpoint 120 via the first base station 102. The endpoint 120 may include, for example, one or more voice-over-packet (VoP) communication devices, e-mail servers, messaging servers, streaming media servers, gaming servers, and/or web servers. In an embodiment, the endpoint 120 is communicatively coupled to a packet-switched network 122. Thus, a communication session between one of the UEs 112 and 114 and the endpoint 120 may involve the exchange of data packets containing voice, video, text, and/or other data. Although FIG. 1 shows one endpoint 120, it is understood that the UEs 112 and 114 may engage in communication sessions with one or more other and/or additional endpoints via the first base station 102.

To support communications over the packet-switched network 122, the wireless telecommunications network 100 may include a packet gateway (P-GW) 124, which may allocate Internet Protocol (IP) addresses for the UEs 112 and 114. The P-GW 124 may exchange packets with base stations 102 and 104 via a serving gateway (S-GW) 126, which may also serve as an anchor point for communication sessions when UEs move between base stations.

The network 100 may also include one or more control nodes that control communications involving UEs such as the UEs 112 and 114. For example, the network 100 may include an MME 128 that controls communications between the UEs 112 and 114 and the S-GW 126. The MME 128 may, in turn, be communicatively coupled to a home subscriber server (HSS) 130, which may store subscriber information.

Figure 2:
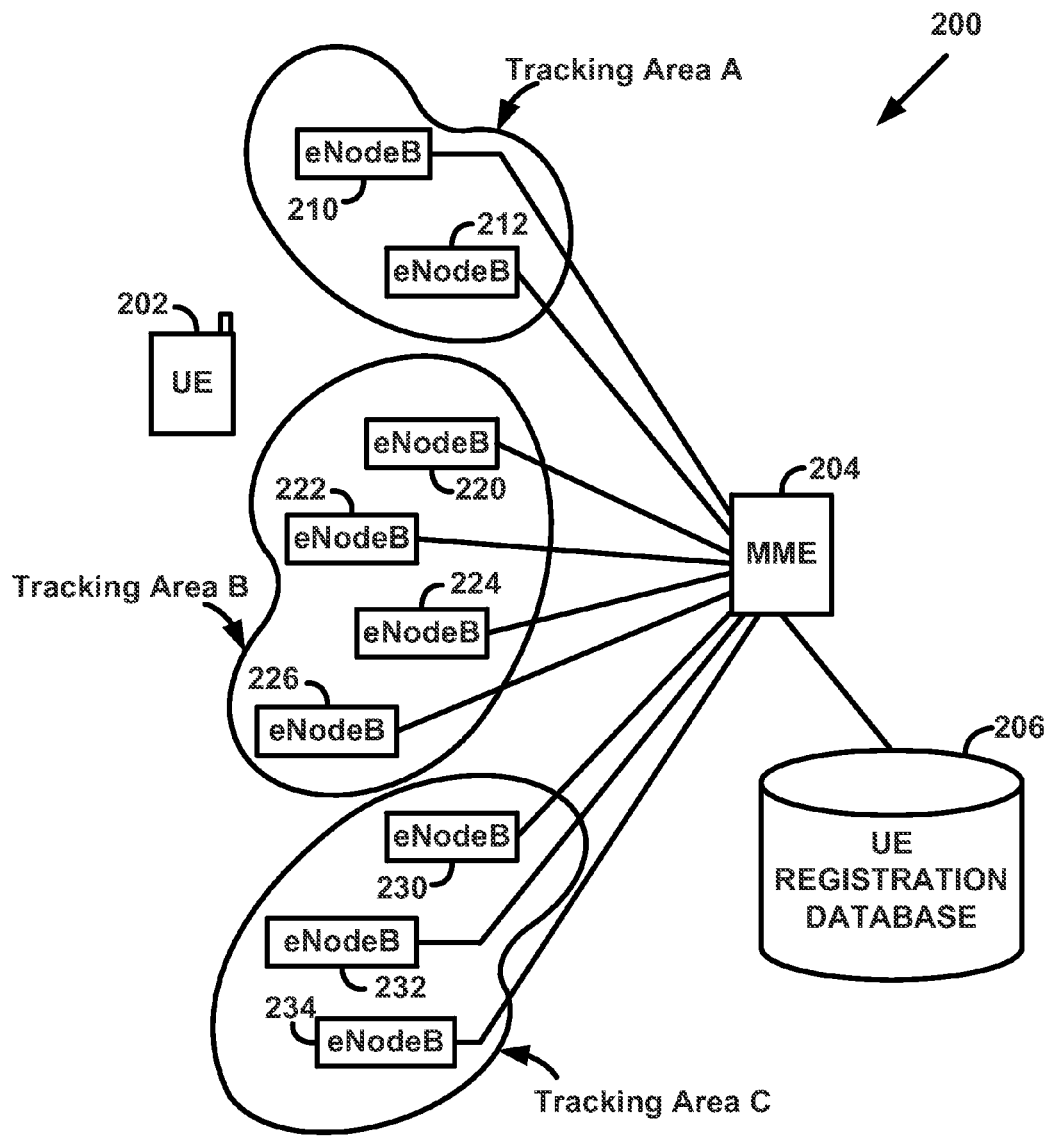
FIG. 2 is a simplified block diagram illustrating at least a portion of the coverage area of a Long Term Evolution (LTE) access network, in accordance with at least one embodiment.

FIG. 2 is a block diagram illustrating a portion of the coverage area of an LTE access network 200, which includes tracking areas. As shown, the LTE access network 200 includes a UE 202, an MME 204, a UE registration database 206, and eNodeBs 210-234.

To facilitate the tracking and paging of the UE 202 in the LTE access network 200, the LTE access network 200 may define a number of "tracking areas," each of which may include a group of (typically contiguous) coverage areas (e.g., cells). In this example, the eNodeBs 210 to 234 are grouped into three different tracking areas A, B, and C to facilitate paging the UE 202. Specifically, tracking area A includes eNodeBs 210 and 212, tracking area B includes eNodeBs 220 to 226, and tracking area C includes eNodeBs 230 to 234. In another embodiment, the LTE access network 200 may implement static non-overlapping tracking areas, overlapping tracking areas (e.g., where adjacent tracking areas share one or more cells), or a combination thereof, depending upon the particular implementation. Further, the LTE access network 200 may, in other examples, include more or fewer tracking areas, and a given tracking area may include more or fewer eNodeBs than the number depicted in FIG. 2.

Under LTE protocols, at a given point in time, the UE 202 may operate in one of three possible states: LTE_DETACHED, LTE_IDLE, and LTE_ACTIVE. The UE 202 typically operates in the LTE_DETACHED state while it is searching for and registering with the LTE access network 200. The UE 202 typically operates in the LTE_ACTIVE state once it has registered with the network and has a radio resource control (RRC) connection with an eNodeB (e.g., while actively engaged in a communication). Further, the UE 202 typically operates in the LTE_IDLE state when it is registered but not currently engaged in an active communication session (e.g., a call or data session) and thus does not have an RRC connection.

To facilitate tracking and paging of the UE 202, the UE 202 may send a registration signal to the MME 204 via one of the eNodeBs 210-234 each time the UE 202 enters a new cell. The registration signal may include information indicative of an update as to the cell in which the UE 202 has entered and/or an update in the tracking area in which the UE 202 is located. Upon receipt of the registration signal, the MME 204 may store the information indicative of the update in a database, such as the UE registration database 206, so as to keep the network updated as to the cell(s) and/or tracking areas where the UE 202 should be paged. Thus, when the MME 204 determines that the UE 202 should be paged, the MME 204 may send one or more paging requests to the eNodeB(s) in the tracking area(s) in which the UE 202 is registered.

The LTE access network 200 may be operable to page the UE 202 for various reasons. For example, when the UE 202 is operating in the LTE_IDLE state, the MME 204 may receive an indication of an incoming communication directed to the UE 202, or otherwise determine that communication with the UE 202 is desired. Accordingly, the MME 204 may send a paging request via the base station(s) that provide service to one or more cells near the UE 202 (e.g., one or more of the eNodeBs 210-234), so that the UE 202 can be paged. The MME 204 may initiate a paging procedure, such as one or more of the methods 300 and 500 described herein, to send the paging request to the UE 202.

To facilitate the paging procedure, the MME 204 may access the UE registration database 206 to identify the cell(s) and/or tracking area(s) in which the UE 202 has registered. The UE registration database 206 may include data that specifies when the UE 202 registered in a particular cell and/or tracking area. Accordingly, when the MME 204 prepares to page the UE 202, the MME 204 may access or request registration data for the UE 202 from the UE registration database 206. In an embodiment, the MME 204 may identify a cell in which UE 202 was last registered (i.e., "the cell of last registration") from the information stored in the UE registration database 206.

In an embodiment, the MME 204 may include a non-transitory computer-readable medium containing program instructions that are executable to provide functionality of the MME 204 described herein. For example, the program instructions may be executable to select a modulated coding scheme (MCS) for a paging request sent in one or more cells, perhaps by implementing one or more of the steps of the method 300 described herein.

Note that in some embodiments, such as the example provided above, the described program instructions may be included in an MME in an LTE network. However, the same or similar program instructions, or portions thereof, may be included in other components of an LTE network and/or included in RAN components in other types of networks (e.g., in an MSC that is part of a CDMA network).

2. Example Operation

Figure 3:
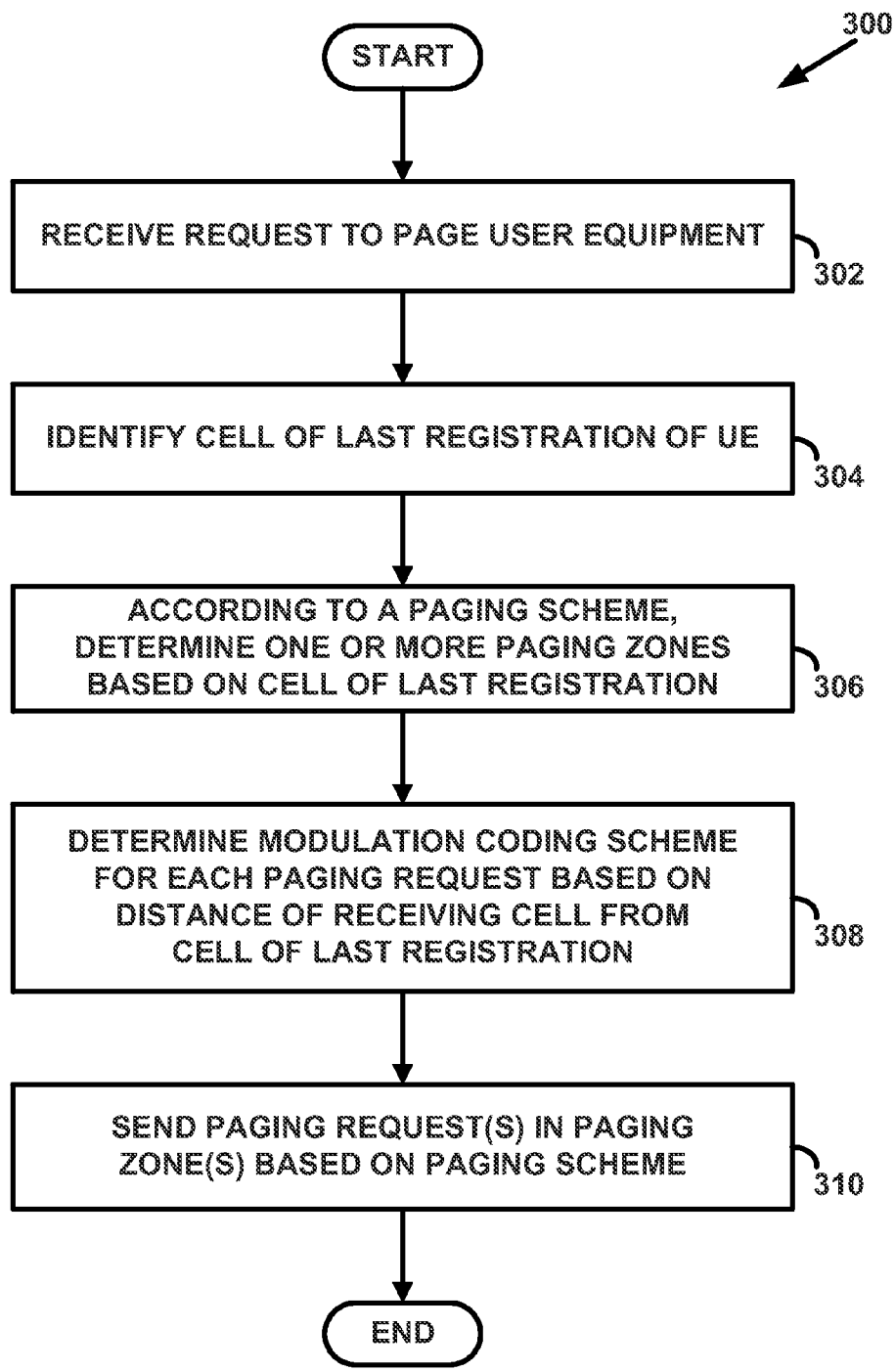
FIG. 3 is a flow diagram of a method for determining a modulation coding scheme (MCS) of a paging request, in accordance with at least one embodiment.

FIG. 3 is a flow diagram of a method 300 for determining an MCS of a paging request. One or more components of a RAN may carry out the method 300 to send a paging request to a UE. While the LTE access network 200 is referenced in the following description of the method 300, it is understood that other wireless communication networks and/or components of one or more wireless communication networks may be used. It also understood that, for the method 300 and other methods disclosed herein, other network architectures and other wireless telecommunications protocols could be used. For example, the method 300 could also be applied by UEs operating in IEEE 802.11 (Wi-Fi) systems, IEEE 802.16 (WiMAX) systems, GSM systems, and/or other CDMA systems, such as IS-2000 or EV-DO systems. As a specific example, a base station in a CDMA network could implement the method 300 to send a paging request to a UE. Other examples are also possible.

At block 302, the method 300 includes receiving an indication that a UE should be paged. The MME 204 may receive a request to page the UE to facilitate establishing communications between the UE 202 and another entity in or beyond the LTE access network, such as another UE or other endpoint. The request to page the UE 202 may include information suitable for determining the identity of the UE 202, such as an address, subscriber identification number, or a similar identifier unique to the UE 202. In one example, the MME 204 may receive the indication from an HSS, such as the HSS 130 depicted in FIG. 1.

At block 304, the method 300 includes identifying the cell of last registration for the UE 202. As previously described, the UE registration database 206 may store information suitable for identifying the cell of last registration for the UE 202, such as a time stamp or similar means of identifying the time at which the last registration occurred. The MME 204 may access the UE registration database 206 to identify the cell of last registration for the UE 202. Alternatively, the request to page the UE 202 may also include information indicative of the cell of last registration for the UE 202. Other examples are also possible.

At block 306, the method 300 includes determining one or more paging zones according to a paging scheme based on the cell of last registration. The MME 204 may include or have access to a (local or remote) database that stores the locations of the cells that receive service from the eNodeBs 210-234 connected to the MME 204. The data storage or database may also store the paging scheme for the LTE access network 200. The MME 204 may access the data storage to determine the paging zones based on the paging scheme and the location of the cells serviced by the eNodeBs 210-234.

The paging scheme may define the one or more paging zones based on a distance of the receiving cell (i.e., the cell receiving the particular page, also referred to herein as the cell in which the particular page is sent) from the cell of last registration. For example, the paging scheme may define three paging zones. A first paging zone may include the cell of last registration. The first paging zone may also one or more cells that are within a first distance of the cell of last registration. A second paging zone may include a one or more cells within a second distance from the cell of last registration, and a third paging zone may include one or more cells that are within a third distance from the cell of last registration. Other paging schemes may include more or fewer paging zones.

Figure 4:
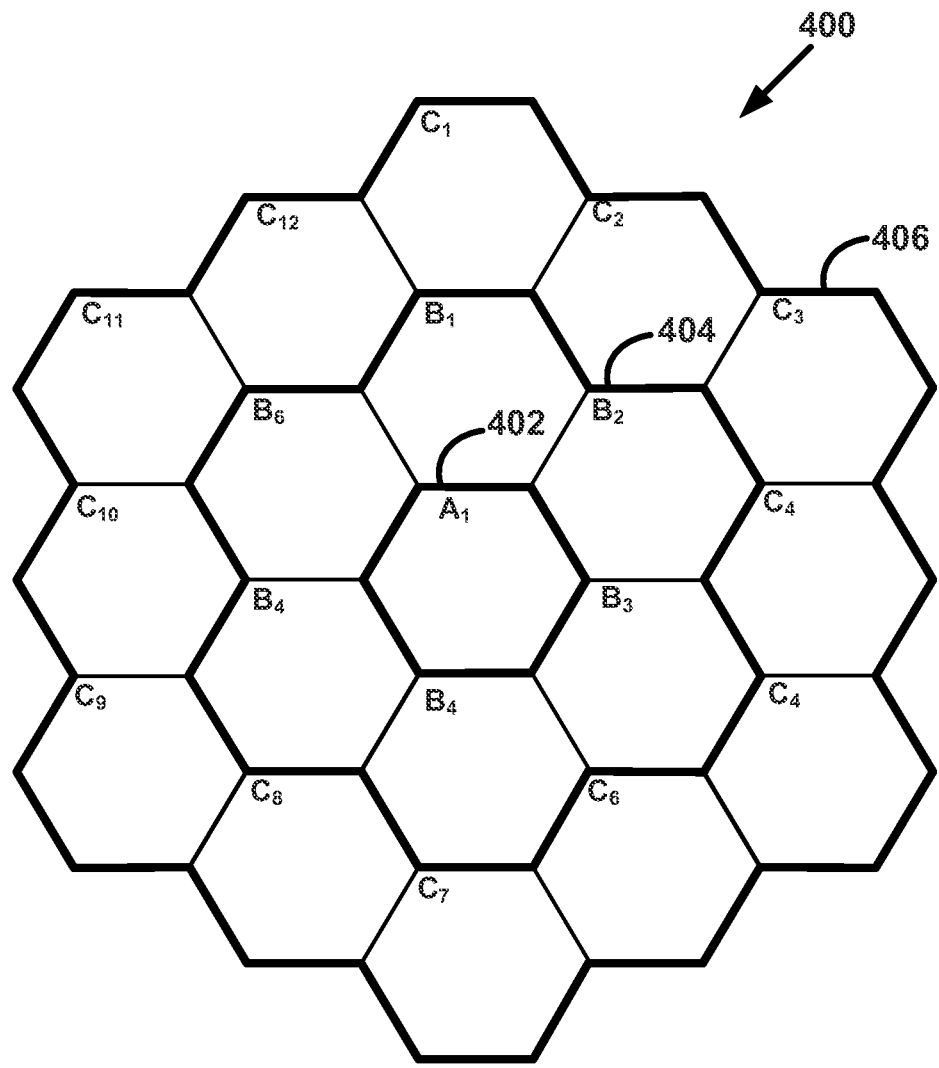
FIG. 4 is a simplified block diagram showing a portion of a radio access network (RAN) in which at least one embodiment could be carried out.

The cells included in each paging zone may be exclusive to that paging zone. That is, the third paging zone may include neither the cells that are in the first paging zone nor the cells that are in the second paging zone. Similarly, the cells included in the second paging zone may not include the cells that are in the first paging zone. FIG. 4 illustrates one example of a paging scheme 400 that defines three paging zones. In this example, a first paging zone 402 includes the cell of last registration, a second paging zone 404 includes the cells within a first distance from the cell of last registration, and the third paging zone includes the cells within a second distance from the cell of last registration. Accordingly, if the MME 204 determined that cell A1 was the cell of last registration for the UE 202, the MME 204 may determine that the first paging zone 402 includes cell A1. The MME 204 may also determine that second paging zone 404 includes cells B1 through B6, and that the third paging zone 406 includes cells C1 through C12. Note that, depending on the size and shape of the cells in a given wireless communication network, the first paging zone 402, the second paging zone 404, and the third paging 406 may include more or fewer cells than those depicted in FIG. 4.

Other example arrangements of paging zones are also possible. For instance, the second paging zone may include a subset of cells within the second distance from the cell of last registration. For instance, the second zone may include the first X cells that are within the second distance from the cell of last registration, where X is a positive integer. Similarly, the third paging zone may include the next Y cells that are within the third distance from the cell of last registration, where Y is also a positive integer.

In yet another example, the paging zones may be defined by tracking areas. For instance, if the cell of last registration is serviced by the eNodeB 220, the first paging zone may include one or more cells serviced by the eNodeB 220. The second paging zone may include one or more additional cells that are within the same tracking area as the cell of last registration. Thus, since the cell of last registration in this example is service by the eNodeB 220, the second paging area may include the cells serviced by the other eNodeBs in tracking area B (e.g., eNodeBs 222-226). The third paging zone may include tracking areas that are near the tracking area that includes the cell of last registration. In this example, the third paging zone may include the cells serviced by the eNodeBs in tracking areas A and C (e.g., eNodeBs 210-212 and 230-234). Other combinations of eNodeBs and/or tracking areas are also possible.

Returning to FIG. 3, the method 300 includes determining the respective MCS to use for (i.e., to apply to) paging requests sent in the various paging zones, at block 308. In order to balance the data resources of each eNodeB with the likelihood of a paging request being received, the paging requests sent in each paging zone may have a different MCS that is selected based at least in part on the probability of the UE 202 receiving the paging request. That is, a paging request having an MCS that may use more data resources (e.g., an MCS that has a relatively lower bits-per-symbol ratio) of the cell are sent in paging zones where the UE 202 is statistically more likely to receive them.

Since the UE 202 typically registers with the MME 204 when it enters a new cell, the UE 202 is most likely in the cell of last registration. For the same reason, the probability that the UE 202 is in a particular paging zone decreases as the distance from the cell of last registration increases. Thus, the paging request sent in the cell of last registration may use an MCS having a low amount of data content (e.g., lower bit-to-symbol ratio), and thus consume more of the cell's data resources, than a paging request sent in a paging zone that is farther away from the cell of last registration. For instance, in an embodiment that uses one of the above-described three-zone paging schemes, the first paging request may have a lower bits-per-symbol ratio than the second paging request, and the second paging request may have a lower bits-per-symbol ratio than the third paging request. In one embodiment, the MCS of the first paging request may be QPSK, the MCS of the second paging request may be 16-QAM, and the MCS of the third paging request may be 64-QAM.

At block 310, the method 300 includes sending one or more paging requests in the one or more paging zones according to the paging scheme. The MME 204 may send a paging request in each paging zone. The paging requests may be sent in each paging zone simultaneously and/or sequentially. In an embodiment, the sequence in which the paging requests are sent in each paging zone may be determined such that the probability of the UE 202 receiving at least one of the paging requests is maximized. That is, paging zones closer to the cell of last registration may receive more paging requests than paging zones that are farther away from the cell of last registration. One possible procedure for sending one or more paging requests is described with respect to the method 500 depicted in FIG. 5.

Once the steps of block 310 are completed, the method 300 may end. Alternatively, the MME 204 may repeat the steps of one or more of the blocks 302-310, perhaps in a situation in which the UE 202 does not receive any of the one or more paging requests. Additionally, the method 300 may end prior to the completion of the steps of block 310. For example, if the paging scheme includes sending paging requests sequentially, some paging requests may not be sent in some paging zones if the UE 202 receives an earlier paging request.

Figure 5:
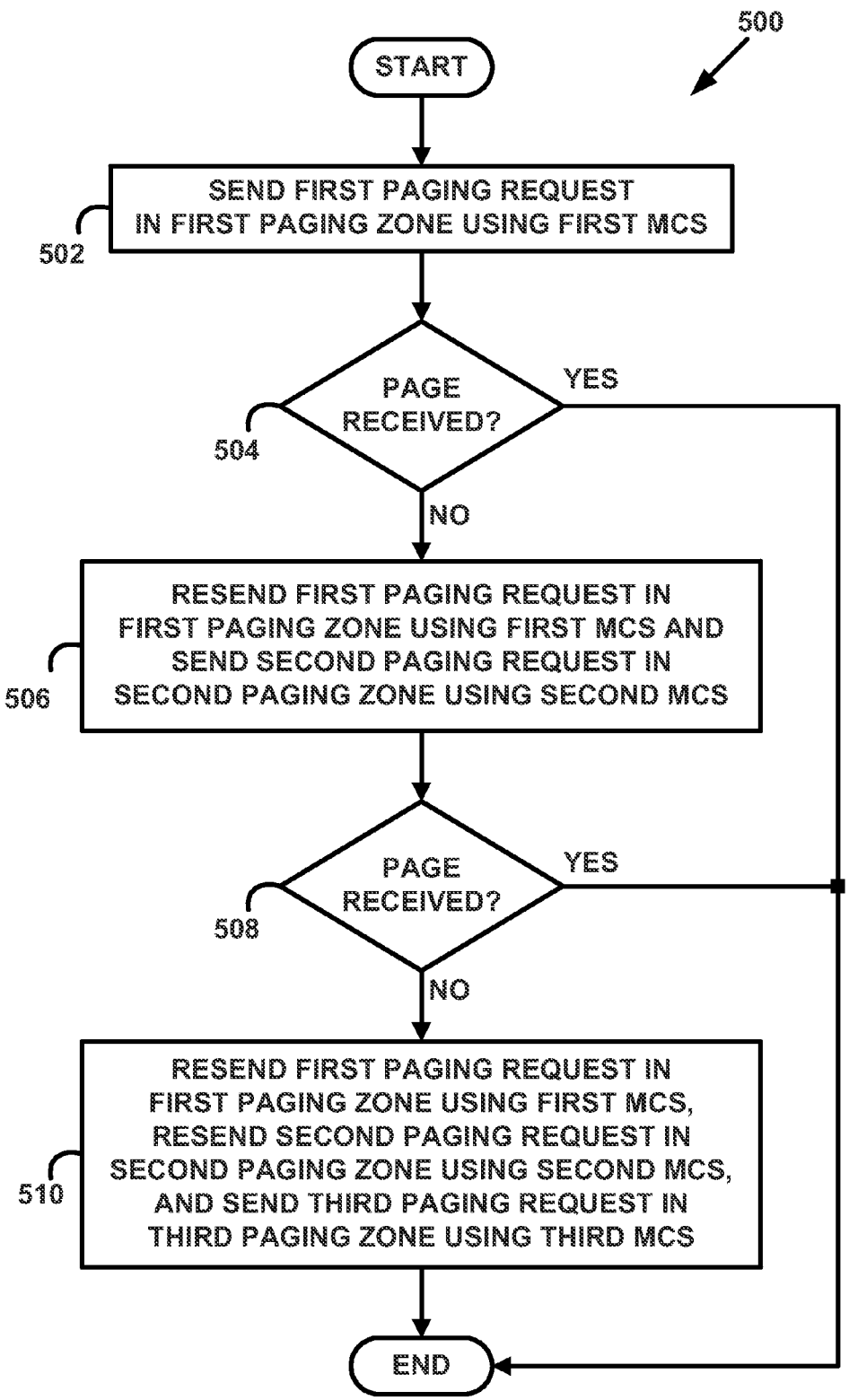
FIG. 5 is a flow diagram of a method for sending one or more paging requests having one or more MCSs, in accordance with at least one embodiment.

FIG. 5 is a flow diagram of a method 500 for sending one or more paging requests having one or more MCSs. A component of a wireless communication network may utilize the method 500 to send the one or more paging requests to the UE in the wireless communication network. While the LTE access network 200 is used to describe the method 500, it is to be understood that other wireless communication networks and/or components of one or more wireless communication networks may be used.

In this example, a paging scheme may include three paging zones. The first paging zone may include the cell of last registration, the second paging zone may include a second group of cells within a first distance from the cell of last registration, and the third paging zone may include a third group of cells within a second distance of the cell of last registration. As an illustration, the first paging zone may include cells serviced by eNodeB 220, the second paging zone may include cells serviced by eNodeBs 222-226, and the third paging zone may include cells serviced by eNodeBs 214, 216, 226, 228, and 230.

At block 502, the method 500 includes sending a first paging request in the first paging zone using a first MCS. In this example, the first MCS is QPSK. The MME 204 may send the first paging request to the UE 202 via the eNodeB 220. The MME 204 then determines whether the UE 202 received the first paging request, at block 504. Upon receipt of the first paging request, the UE 202 may send an acknowledgement to the MME 204 via the eNodeB 220. Upon receipt of the acknowledgement, the MME 204 may determine that the UE 202 received the first paging request. If the MME 204 determines that UE 202 received the first paging request, the method 500 may end.

If the MME 204 determines that the first paging request was not received—that is, that the UE 202 did not receive the first paging request—the MME 204 may resend the first paging request in the first paging zone, and send a second paging request in the second paging zone, at block 506. The MME 204 may resend the first paging request using the first MCS and the second paging request using a second MCS. Since the second paging zone includes more cells—and thus may provide service to more UEs—than the first paging zone, the second MCS may have a higher a bits-per-symbol ratio than the first MCS. This may reduce the amount of data consumed by the second paging request (relative to a hypothetical use of the first MCS on the second paging request and/or to the amount of data consumed by the first paging request itself) while providing the UE 202 with an opportunity to receive the second paging request that is commensurate with (i.e., appropriate in light of) the probability that the UE 202 is in a cell included in the second paging zone. For instance, if the first MCS is QPSK, the second MCS may be 16-QAM. Other examples are also possible.

In this example, the second paging zone includes the cells that are in the same tracking zone as the cell of last registration. Thus, the MME 204 may send the second paging request via the eNodeBs in the same tracking area as the eNodeB 220, namely the other eNodeBs in tracking area B (eNodeBs 222-226).

At block 508, the method 500 includes determining whether the first paging request and/or the second paging request was received by the UE 202. As previously described, the UE 202 may send an acknowledgement message to the MME 204 via the eNodeB providing service to the cell in which the UE 202 is located. The MME 204 may receive the acknowledgement from the UE 202 via one of the eNodeBs 220-226. If the MME 204 receives the acknowledgement, the MME 204 may determine that one or both of the first paging request and the second paging request was received, and the method 500 may end.

If the MME 204 determines that the UE 202 received neither the first paging request nor the second paging request, the MME 204 may perform the steps of block 510. At block 510, the method 500 includes resending the first paging request in the first paging zone, resending the second paging request in the second paging zone, and sending a third paging request in the third paging zone. The MME 204 may send the first paging request using the first MCS, the second paging request using the second MCS, and the third paging request using a third MCS. Since the third paging zone may include more cells than either of the first paging zone or the second paging zone, the third MCS may have a higher bits-per-symbol ratio than the second MCS and may consume less data resources than did the first paging request, and may also consume less data resources that did the second paging request. While the third paging request may be more susceptible to interference or signal loss than either of the first paging request or the second paging request, this risk will typically be balanced by the low probability that the UE 202 is in the third paging zone. In at least one embodiment, the second MCS is 16-QAM and the third MCS may be 64-QAM. Other examples are also possible.

After the MME 204 has completed the steps of block 510, the method 500 may end. If the UE 202 did not receive any of the paging requests, the MME 204 may send a signal—to the entity that had requested that the MME 204 page the UE 202—indicating that the UE 202 did not respond to being paged. Alternatively, the MME 204 may perform another iteration of one or more of the steps of one or more blocks of the method 500.

In some embodiments, the MME 204 may use a different paging scheme when performing the method 500. For instance, the paging zones may not be arranged by tracking areas. In one example, the paging zones may be based on an arrangement similar to the arrangement depicted in FIG. 4. The MME 204 may send the first paging request in the first paging zone 402, the second paging request in the second paging zone 404, and the third paging request in the third paging zone 406. This example illustrates another embodiment in which the respective MCSs for various paging requests could be selected based at least in part on the distance of the receiving cell from the cell of last registration. Additionally, the first paging zone 402, the second paging 404, and the third paging zone 406 may include more or fewer cells than those illustrated in FIG. 4 depending on the size and shape of cells in a given RAN, perhaps among one or more other variables.

As shown by the above-described examples, the amount of data consumed by a paging request may be inversely proportional to the distance of the UE 202 from the cell of last registration. This approach allows for conservation of data resources in cells in which the UE 202 is less likely to receive a given paging request, thereby providing more data resources for data communications between other UEs in these cells and one or more entities in and beyond the wireless communication network. However, the probability of a UE receiving a particular paging request may be dependent on one or more factors other than or in addition to the distance between a cell receiving the paging request and the cell of last registration. Thus, one or more factors other than or in addition to that distance may be used in various embodiments to select an MCS for a given paging request.

Additionally, it is noted that the above-described examples illustrate some possible manners of selecting respective MCSs for various paging requests. It may be the case in some embodiments, however, that the amount of data consumed by a paging signal may not be inversely proportional to the distance between the (i) UE 202 (and/or the cell in which the UE 202 is currently located) and (ii) the cell of last registration. As one example, in a RAN that does not operate according to LTE standards, the amount of data consumed by a paging request (e.g., the bits-per-symbol ratio of an MCS) may be directly proportional to such a distance. Similarly, reducing the bits-per-symbol ratio of a paging request as such a distance increases may well be suitable for certain implementations.

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions could be implemented by software (e.g., machine language instructions stored in data storage and executable by a processor), firmware, and/or hardware. And more generally, while certain example embodiments are described herein, those of skill in the art will understand that changes and modifications may be made to the described embodiments without departing from the true scope and spirit of the present methods and systems, as such true scope and spirit are defined by the claims.

What is claimed is:

1. A method comprising:
   receiving, by an entity in a radio access network ("RAN"), a request to page a user equipment ("UE");
   identifying a coverage area in the RAN in which the UE last registered;
   determining a first modulation coding scheme ("MCS") to use for paging the UE in the coverage area in which the UE last registered;
   determining a second MCS to use for paging the UE in a first group of coverage areas outside of the coverage area in which the UE last registered, wherein the first MCS uses fewer bits-per-symbol than the second MCS, and wherein the first group of coverage areas does not include the coverage area in which the UE last registered;
   paging the UE in the coverage area in which the UE last registered using the first MCS; and
   paging the UE in the first group of coverage areas using the second MCS.

2. The method of claim 1, wherein the RAN comprises a long term evolution ("LTE") access network.

3. The method of claim 1, further comprising:
   determining a third MCS to use for paging the UE in a second group of coverage areas outside of the first group of coverage areas, wherein the second MCS uses fewer bits-per-symbol than the third MCS; and
   paging the UE in the second group of coverage areas using the third MCS.

4. The method of claim 3, wherein the first MCS is a quadrature phase-shift keying ("QPSK") modulation scheme, the second MCS is a 16-quadrature amplitude modulation ("QAM") scheme, and the third MCS is a 64-QAM scheme.

5. A method comprising:
   receiving, by an entity in a radio access network ("RAN"), a request to page a user equipment ("UE");
   identifying a coverage area in the RAN in which the UE was last registered; sending in a first group of coverage areas a first paging request using a first modulation coding scheme ("MCS"), wherein the first group of coverage areas comprising one or more coverage areas in the RAN that are within a first distance from the coverage area in which the UE last registered;
   determining whether the UE received the first paging request; and
   in response to determining that the UE did not receive the first paging request, (i) resending in the first group of coverage areas the first paging request using the first MCS, and (ii) sending in a second group of one or more coverage areas a second paging request using a second MCS, the second group of coverage areas comprising one or more coverage areas in the RAN that are within a second distance from the coverage area in which the UE last registered,
   wherein (i) the second distance is greater than the first distance (ii) the second group of one or more coverage areas does not include the first group of one or more coverage areas, and (iii) the first MCS uses fewer bits-per-symbol than the second MCS.

6. The method of claim 5, wherein the RAN comprises a long term evolution ("LTE") access network.

7. The method of claim 5, wherein the first group of coverage areas further comprises the coverage area in which the UE was last registered.

8. The method of claim 7, further comprising:
   determining whether the UE received at least one of the first and second paging requests; and
   in response to determining that the UE did not receive at least one of the first and second paging requests:
      resending in the first group of coverage areas the first paging request using the first MCS;
      resending in the second group of coverage areas the second paging request using the second MCS; and
      sending in a third group of coverage areas a third paging request using a third MCS, the third group of coverage areas comprising one or more coverage areas in the RAN that are within a third distance of the coverage area in which the UE was last registered,
   wherein (i) the third distance is greater than the second distance, (ii) the third group of one or more coverage areas does not include the first group of one or more coverage areas or, the second group of one or more coverage areas, and (iii) the third MCS is different from the first MCS and the second MCS.

9. The method of claim 8, wherein the second paging request uses more data resources than does the third paging request.

10. The method of claim 8, wherein the first MCS is a quadrature phase-shift keying ("QPSK") modulation scheme, the second MCS is a 16-quadrature amplitude modulation ("QAM") scheme, and the third MCS is a 64-QAM scheme.

11. A radio access network ("RAN") comprising:
    a plurality of base stations;
    a user equipment ("UE"); and
    a mobility management entity ("MME") that is configured to:
       receive a request to page the UE;
       identify a cell in the RAN in which the UE last registered;
       determine a first modulation coding scheme ("MCS") to use for paging the UE in the coverage area in which the UE last registered;
    determine a second MCS to use for paging the UE in a first group of coverage areas outside of the coverage area in which the UE last registered, wherein the first MCS uses fewer bits-per-symbol than the second MCS, and wherein the first group of coverage areas does not include the coverage area in which the UE last registered;
       page the UE in the cell in which the UE last registered using the first MCS; and
       page the UE in the first group of cells using the second MCS.

12. The RAN of claim 11, wherein the RAN is a long term evolution ("LTE") access network.

13. The RAN of claim 11, wherein the MME is further configured to:
    determine a third MCS to use for paging the UE in a second group of cells outside of the first group of cells, wherein the second MCS uses fewer bits-per-symbol than the third MCS; and
    page the UE in the second group of cells using the third MCS.

14. The RAN of claim 13, wherein the first MCS is a quadrature phase-shift keying ("QPSK") modulation scheme, the second MCS is a 16-quadrature amplitude modulation ("QAM") scheme, and the third MCS is a 64-QAM scheme.

\* \* \* \* \*